(12) United States Patent
Lee

(10) Patent No.: US 8,176,343 B2
(45) Date of Patent: May 8, 2012

(54) METHOD FOR PROVIDING INFORMATION FOR POWER MANAGEMENT OF DEVICES ON A NETWORK

(75) Inventor: Jae Wook Lee, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 711 days.

(21) Appl. No.: 12/160,198

(22) PCT Filed: Dec. 27, 2006

(86) PCT No.: PCT/KR2006/005744
§ 371 (c)(1),
(2), (4) Date: Jan. 12, 2009

(87) PCT Pub. No.: WO2007/078081
PCT Pub. Date: Jul. 12, 2007

(65) Prior Publication Data
US 2009/0222679 A1    Sep. 3, 2009

(30) Foreign Application Priority Data
Jan. 6, 2006    (KR) .......................... 10-2006-0001663

(51) Int. Cl.
G06F 13/10 (2006.01)
G06F 1/26 (2006.01)
G06F 15/173 (2006.01)

(52) U.S. Cl. ............ 713/300; 713/1; 713/310; 713/320; 709/220; 709/223; 709/224

(58) Field of Classification Search ................. 726/2, 18; 713/300, 310, 320–324, 330, 340; 709/201–237
See application file for complete search history.

(56) References Cited

U.S. PATENT DOCUMENTS

| | | | |
|---|---|---|---|
| 6,910,068 B2 * | 6/2005 | Zintel et al. .................... | 709/220 |
| 7,818,580 B2 * | 10/2010 | Bardsley et al. .............. | 713/182 |
| 7,949,703 B2 * | 5/2011 | Matsuzaki et al. ............ | 709/201 |
| 7,966,382 B2 * | 6/2011 | Ahluwalia et al. ............ | 709/218 |
| 2002/0078161 A1 * | 6/2002 | Cheng ........................... | 709/208 |
| 2004/0249923 A1 * | 12/2004 | Ko et al. ....................... | 709/223 |
| 2006/0005052 A1 * | 1/2006 | Roe et al. ...................... | 713/300 |

* cited by examiner

Primary Examiner — Kim Huynh
Assistant Examiner — Fahmida Rahman
(74) Attorney, Agent, or Firm — Lee, Hong, Degerman, Kang & Waimey

(57) ABSTRACT

The present invention relates to a method for providing information for power management of devices connected to a network. The present method creates a PM (Power Management) server list which includes, for at least one PM server, a pair of friendly names including a friendly name allocated to the PM server, and displays, for the at least one PM server, the other friendly name of the pair of friendly names, i.e., a friendly name allocated to an AV media server or an AV device instead of one friendly name allocated to the PM server in the event that information included in the created PM server list is provided to a user.

3 Claims, 5 Drawing Sheets

Updated PM Server List

| Friendly Name (for PM server) | Associated Friendly Name (for AV device) | MAC Address |
|---|---|---|
| ⋮ | ⋮ *301* | ⋮ |
| PM_Server | AV_Media_Server | 90ab680123fe |
| IPTV_PM_Server | - | 1fab92a775ad |
| ⋮ | ⋮ | ⋮ |

FIG. 3

Updated PM Server List

| Friendly Name (for PM server) | Associated Friendly Name (for AV device) | MAC Address |
|---|---|---|
| . . . | . . .  *301* | . . . |
| PM_Server | AV_Media_Server | 90ab680123fe |
| IPTV_PM_Server | - | 1fab92a775ad |
| . . . | . . . | . . . |

FIG. 4A

AV Device List

| Friendly Name | MAC Address |
|---|---|
| . . . | . . . |
| AV_Media_Server | 90ab680123fe |
| Media_Renderer | a7ff8810cdf6 |
| . . . | . . . |

FIG. 4B

PM Server List

| Friendly Name | MAC Address |
|---|---|
| . . . | . . . |
| PM_Server | 90ab680123fe |
| IPTV_PM_Server | 1fab92a775ad |
| . . . | . . . |

METHOD FOR PROVIDING INFORMATION FOR POWER MANAGEMENT OF DEVICES ON A NETWORK

CROSS-REFERENCE TO RELATED APPLICATIONS

This application is a national stage application of International Application No. PCT/KR2006/005744, filed on Dec. 27, 2006, which claims the benefit of earlier filing date and right of priority to Korean Application No. 10-2006-0001663, filed on Jan. 6, 2006, the contents of all of which are hereby incorporated by reference herein in their entirety.

1. TECHNICAL FIELD

The present invention is related to a method for providing information for power management of devices connected to a network.

2. BACKGROUND ART

Recently, inexpensive and pervasive networking technologies based on various small devices are emerging or being commercialized. People can make good use of various home appliances such as refrigerators, TVs, washing machines, PCs, and audio equipments once such appliances are connected to a home network. For the purpose of such home networking, UPnP™ (hereinafter, it is referred to as UPnP for short) specifications have been proposed. UPnP technology employs distributed and open network architecture, enabling the user to control respective devices of various types or services provided by the devices by using one or more than one control point (in general, it is termed as 'CP' for short) based on well-known standard networking technologies such as IP (Internet Protocol), HTTP, and so on.

UPnP technology automatically discovers a UPnP compliant device (and a service provided by the device) on a network, models the service of the corresponding device as state variables, and enables a control point or another device to use the modeled service. A control point (CP) is one of control applications and a plurality of CPs can be installed together in a particular UPnP device carrying out a different service. Also, CPs can be installed individually distributed over a number of devices.

Meanwhile, an AV home network based on UPnP can be equipped with a device carrying out the role of a server such as an AV media server or PM (Power Management) server; and a device carrying out the role of a media renderer such as a digital television.

An AV media server is a device providing various media files to be reproduced through a media renderer; a PM server carries out power management (management of a state such as active, sleep, and hibernation) about physical resources where the server is installed.

In this way, a PM server can be realized as a single independent device or can be realized together in a device of another function. The latter case is called as an embedded device; for example, an AV media server and PM server can be implemented in a single device.

An AV media server (or a device providing a different service) and PM server are controlled independently by separate control points. Generally, a control point which controls the former is called as an AV control point; while a control point which controls the latter is called as a PM control point. Since a PM CP discovers PM servers only and carries out controlling thereof, unless the user recognizes implementation forms of all the devices on a network, the user will not be able to figure out which PM server should be controlled through the PM CP in order to control power status of an associated device or resources of the device. For example, when an embedded device exists on a network, where an AV media server and PM server are implemented together, even if the user wants to check or change the power status of an AV media server of the embedded device, it cannot be known with a list of discovered PM servers which PM server carries out the role.

3. DISCLOSURE OF THE INVENTION

One object of the present invention is to provide a method for creating power management information to associate a device installed together in an embedded device where a power management server is installed.

Another object of the present invention is, by using associated power management information, to provide a method for enabling a user to conveniently select a device to which the user wants to apply power management.

One method for creating information for power management of devices on a network according to the present invention comprises a step, conducted by a first application, for receiving names and addresses from each of power management servers on the network and creating a power management server list; a step for checking whether an address identical to the received network address is registered in a device list created by a second application; and a step for, if registered, updating the power management server list such that information written in the device list is added to the power management server list.

Also, one method for providing information for power management of devices on a network according to the present invention comprises creating a power management server list which contains, for at least one power management server, a pair of user friendly names including a user friendly name allocated to the one power management server; and for the at least one power management server, displaying one user friendly name of the pair of user friendly names instead of other user friendly name pertaining to the pair allocated to the one power management server, when displaying information of the power management server list.

In one embodiment according to the present invention, the network address is unique MAC (Media Access Control) address allocated to a LAN card.

In one embodiment according to the present invention, the second application is a control point for invoking an action to an AV media server or AV devices on the network.

In one embodiment according to the present invention, information contained in the device list to be added to the power management server list according to the update is a user friendly name allocated to an AV media server or AV device.

In one embodiment according to the present invention, the at least one power management server includes a power management server constituting an embedded device together with an AV media server.

In one embodiment according to the present invention, the user friendly name pair consists of a user friendly name allocated to an AV media server or AV device and a user friendly name allocated to a power management server.

4. BRIEF DESCRIPTION OF THE DRAWINGS

FIG. 3 illustrates an example where information of a PM server list is updated based on information of an AV device list according to one embodiment of the present invention;

Figure 5:
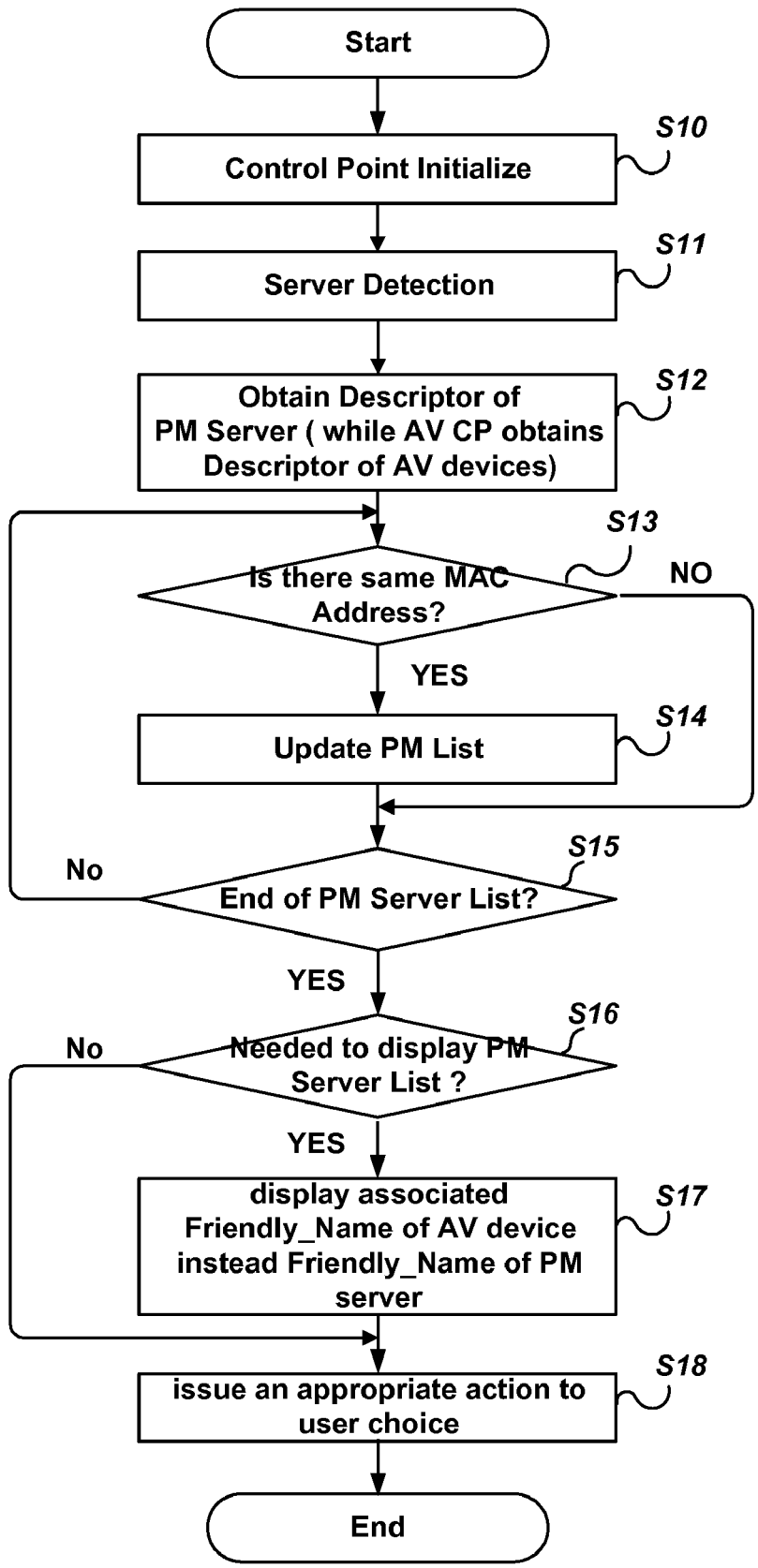
Figure 6:
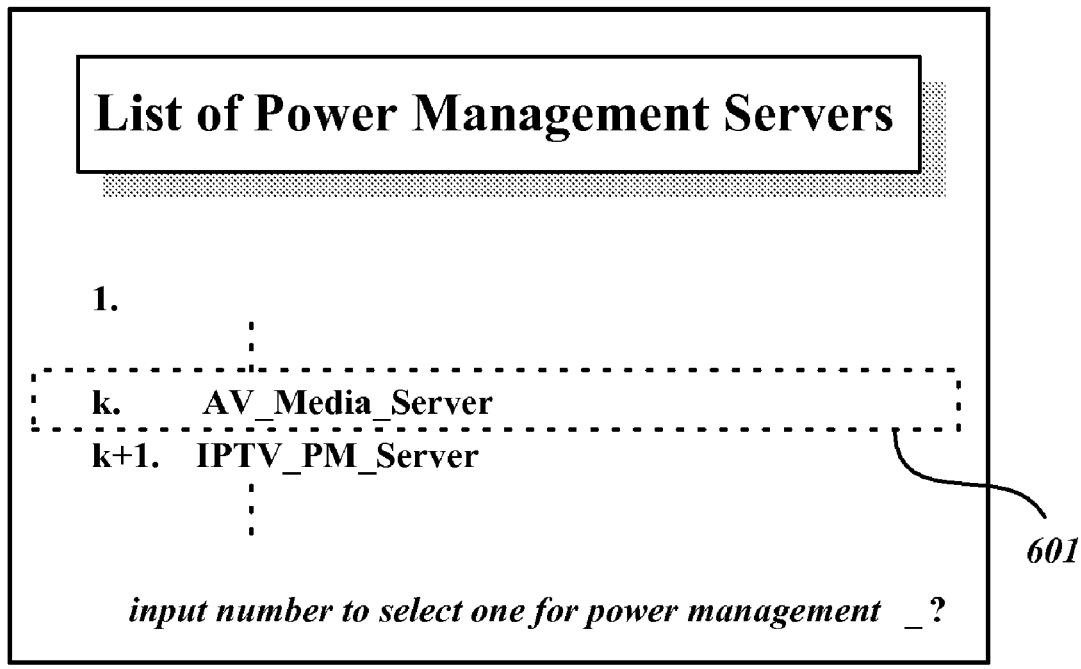

FIGS. 4A and 4B respectively illustrate examples of an AV device list and PM server list created independently by an AV control point and PM control point;

FIG. 5 illustrates a flow chart of a method for providing information for power management of devices according to one embodiment of the present invention; and FIG. 6 illustrates one example of a screen display of a PM server list provided to the user about a PM server list illustrated in FIG. 3.

5. BEST MODE FOR CARRYING OUT THE INVENTION

Hereinafter, according to the present invention, embodiments of a method for providing information for power management of devices on a network will be described in detail with reference to appended drawings.

Figure 1:
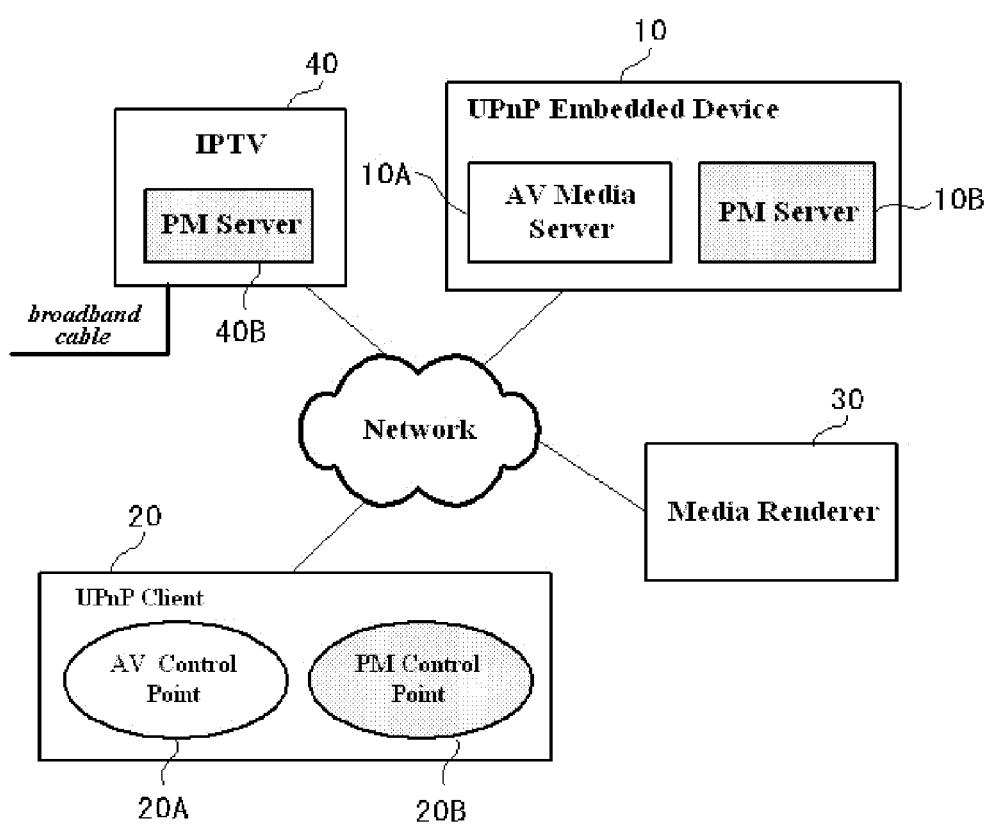
FIG. 1 illustrates an exemplified structure of a home network based on UPnP to which applied is a method for providing information for power management of devices according to the present invention.

FIG. 1 illustrates an exemplified structure of a home network based on UPnP to which applied is a method for providing information for power management of devices according to the present invention.

The home network illustrated in FIG. 1 includes an embedded server device 10 where an AV media server 10A and PM (Power Management) server 10B are installed; a client 20 where an AV control point 20A and PM control point 20B are installed; a media renderer 30 which renders media data streamed from the AV media server 10A; and an IPTV 40 which receives data stream of a TV broadcasting program received through a broadband line and renders the data stream selectively according to the user's request. And a PM server 40B is installed also in the IPTV 40. The client 20 can be installed in another UPnP device, e.g., a media renderer or it can be installed in a particular device, e.g., a portable device such as PDA.

Although a single AV media server 10A is installed in the embedded server device 10 in the illustration of FIG. 1, it is equally possible to install multiple AV media servers.

The AV control point 20A can carry out a desired inquiry or control operation related to presentation of AV data by invoking an arbitrary action to the UPnP device (more specifically, various services provided by the device), the AV media server 10A in the example of FIG. 1, media renderer 30, or IPTV 40.

Figure 2:
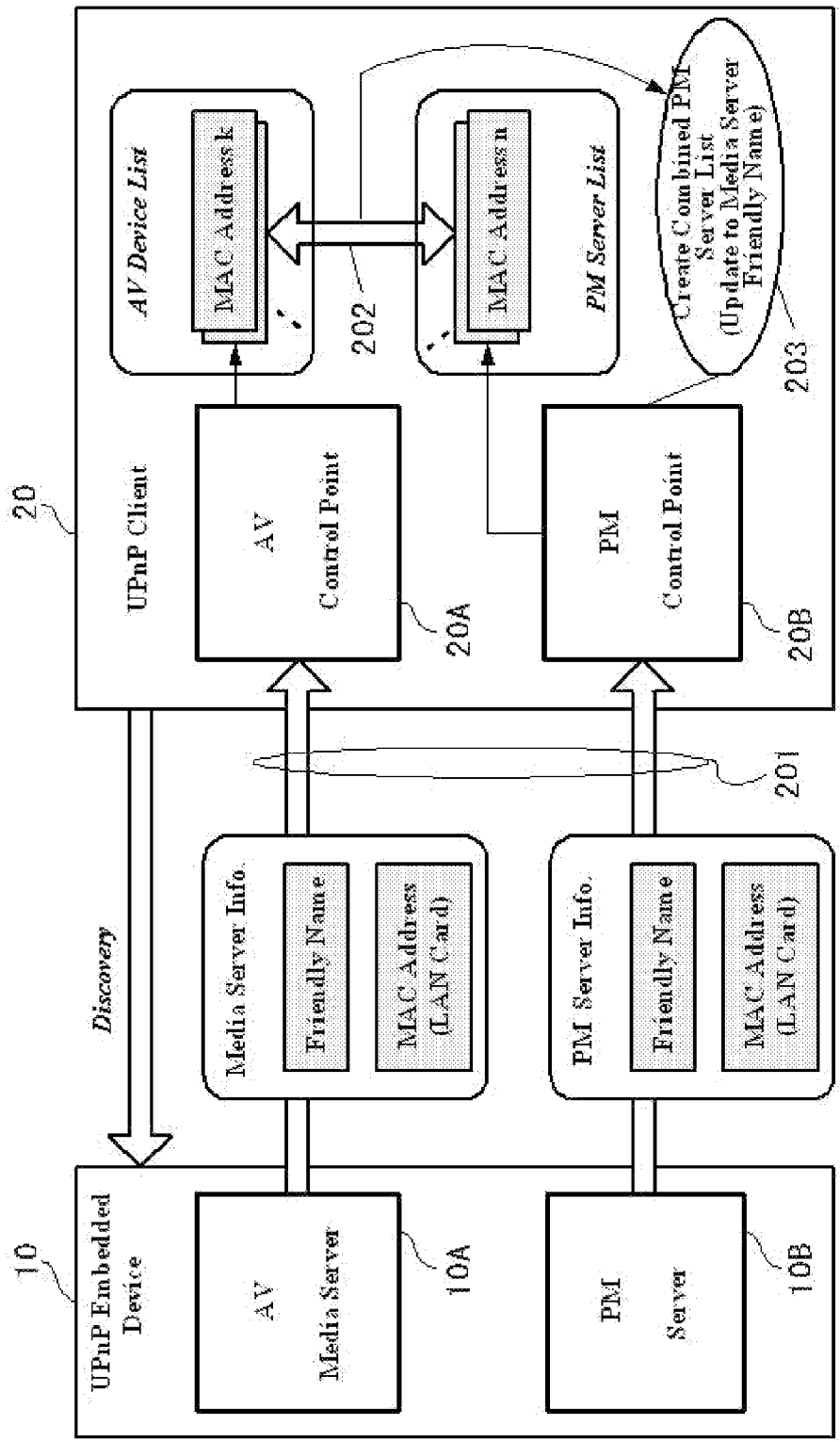
FIG. 2 is a diagram graphically illustrating exchange of information between an embedded server device and a client of FIG. 1 and information processing procedure according thereto.

FIG. 2 illustrates exchange of information between the embedded server device 10 and the client 20 and information processing procedure according thereto for the purpose of specific description about an embodiment of the present invention. As shown in the figure, an AV control point 20A installed in the client 20 discovers an AV media server 10A installed in the embedded server device 10 and the media renderer 30 through a discovery process (e.g., a process of transmitting M-search message and receiving the corresponding response).

And the PM control point 20B installed in the client 20 also discovers a PM server 10B in the embedded server device 10 and a PM server in the IPTV 40 through a discovery procedure. During the discovery procedure respective devices provide the corresponding control point with device & service descriptor 201.

The descriptor information includes "Friendly Name" of a device (it is a user friendly identifier which is a name used for enabling the user to recognize a specific device by characters) and a unique identifier of a physical communication module used for the device to access a network (e.g., MAC (Media Access Control) address when the physical communication module corresponds to a LAN card).

Therefore, the PM control point 20B searches descriptor information of AV devices which the AV control point 20A has obtained independently of the PM control point 20B and descriptor information of PM servers which the PM control point 20B itself has obtained for unique identifiers specifying the same physical communication module 202; when unique identifiers specifying the same communication module are found, the corresponding device is determined that it is installed in the same embedded device. In this manner, the PM control point 20B, for a PM server determined as a device installed in an embedded device, updates 203 a PM server list which the PM control point 20B has created by juxtaposing a user friendly name of an associated AV devices (i.e., an AV device installed in the same embedded device) with a user friendly name of the PM server as shown in FIG. 3.

The updated PM server list of FIG. 3 illustrates an example where a PM server list obtained from an AV device list and PM server list of FIGS. 4A and 4B created from descriptor information received respectively by the AV control point 20A and PM control point 20B of an AV home network illustrated in FIG. 1 has been updated. FIGS. 3A, 3B and 4 are those figures illustrating with only such information associated with the present invention; a list under the management of each control point necessarily contains a lot more information in addition to the illustrated information.

When the PM control point 20B, in response to a relevant input from the user in order to invoke an operation required for power management, provides the user with a PM server list through an appropriate UI (User Interface) in order to enable the user to select a device to which a power management operation is to be applied according to the user input, a user friendly name of an associated AV device is provided instead of the user friendly name of a PM server if the user friendly name of the associated AV device exists. This is because the user is more familiar with the name of an AV device, thereby allowing the user to recognize which device is which and at least to recognize a device much more quickly than the case of utilizing the user friendly name of a PM server.

FIG. 5 illustrates a flowchart of a method for providing information for power management of devices according to one embodiment of the present invention. The flowchart of FIG. 5 is carried out on the standpoint of a PM client and described in detail along with operations of devices illustrated in FIG. 1.

First, an AV control point 20A and PM control point 20B in the client 20 are initialized (S10) and respectively carry out a discovery process for an associated device and/or server. According to this, various devices and/or servers including an AV media server 10A and PM server 10B in an embedded server device 10 are detected individually (S11).

During the discovery process, the AV control point 20A and PM control point 20B respectively acquire descriptor information of an associated device and/or server (S12).

The PM control point 20B, after acquiring descriptor information from all the PM servers, creates a PM server list as shown in FIG. 4B based on the acquired information. Necessarily, the AV control point 20A also creates an AV device list as shown in FIG. 4A in the same manner.

The PM control point 20B, after completion of creating a PM server list, requests and receives an AV device list created by the AV control point 20A, after which the PM control point 20B checks whether an identifier exists in the received AV device list identical to the unique identifier of a communication module (e.g., MAC address of a LAN card) in the created PM server list. If there existed at least one identical identifier (S13) (MAC address "90ab680123fe" in the examples of FIGS. 4A and 4B falls into this case), the PM control point 20B carries out an operation of associating the same identifier in a PM serer list 301 with a user friendly name in an AV device list associated with the identifier as shown in FIG. 3 (S14).

The PM control point 20B checks up to the unique identifier of a communication module of the last PM server in a PM server list whether an identical identifier exists in the AV device list (S15); if existed, the PM server list is updated in the same manner above. Otherwise, the operation of updating a PM server list is terminated.

After an updated PM server list is obtained through the procedure above (e.g., a list such as the one in FIG. 3), in case of occurring a situation that the PM control point 20B should display a list about PM servers under its own management to the user (e.g., when the user requests display of a PM server list) (S16), the PM control point 20B displays user friendly names of PM servers in a PM server list created/updated by the PM control point 20B through an appropriate UI. Meanwhile, if a user friendly name of an associated AV device exists, the name is displayed instead of a user friendly name of a PM server (S17). FIG. 6 illustrates an example of a screen output provided to the user with regard to a PM server list of FIG. 3. In the example of FIG. 6, "AV_Media_Server" is displayed instead of "PM_Server" 601.

When the user requests power management for a device selected through an appropriate menu provided according to selecting an item on the displayed screen as shown in FIG. 6, e.g., when the user requests one from among inquiry about power status of the corresponding device, Wake On, or switch to hibernation state, an appropriate action according thereto is invoked to a PM server of a selected item (S18). For example, when a k-th item is selected in the screen of FIG. 6, the PM control point 20B invokes an action according to a desired operation to a PM server 10B installed with an AV media server 10A.

In the description of the above embodiment, a user friendly name "IPTV_PM_Server" of a PM server 40B implemented in the IPTV 40 is so specified that the user can recognize from the name a PM server installed in an IPTV. The preceding statement can be made true by employing an assumption that when a PM server is developed or adapted to an arbitrary device, the PM server is already supposed to be used for an IPTV. In that way, as in the preceding embodiment, by including characters to recognize an IPTV in a user friendly name of a PM server, the user can conveniently recognize an installed device through the user friendly name.

However, such a method cannot be applied to the case of using a PM server commonly for a number of devices. Therefore, as in the method described above, once a user friendly name of a PM server is specified generally and can be made available by associating with a user friendly name of an AV device where the PM server is installed together, development of a PM server would be easy and also the user can easily recognize a device where a PM server is installed without revising or changing a PM server even when the user additionally adapts a PM server to a particular device.

The present invention is not limited to the foregoing description of preferred embodiments and those skilled in the art may easily understand that the invention and various embodiments can be utilized with improvements, modifications, substitutions, or additions within the scope of the invention. If the improvements, modifications, substitutions, or additions belong to the scope of the invention as defined by the following appended claims, the spirit should also be regarded to belong to the present invention.

The invention claimed is:

1. A method for preparing information for power management of devices on a network, the method comprising:
   receiving, by a first application, a name and a network address from each of a plurality of power management servers on the network;
   creating, by the first application, a power management server list;
   checking whether an address identical to the received network address is registered in a device list created by a second application; and
   updating the power management server list if the address identical to the received network address is registered in the device list such that information in the device list is added to the power management server list,
   wherein the information in the device list to be added to the power management server list comprises a user friendly name assigned to an audio-video (AV) device,
   wherein the user friendly name is associated with the address identical to the received network address and registered in the device list,
   wherein updating the power management server list comprises adding the user friendly name in association with a network address in the power management server list that is identical to the received network address,
   wherein the first application is a first control point for invoking an action for power management to the plurality of power management servers,
   wherein the second application is a second control point for invoking an action to AV devices on the network, and
   wherein the first control point and the second control point are installed in a Universal Plug and Play (UPnP) device.

2. The method of claim 1, wherein the network address is a unique address allocated to a communication module for carrying out signal exchange, the communication module physically connected to the network.

3. The method of claim 2, wherein the unique address is a MAC (Media Access Control) address.

* * * * *